(12) United States Patent
Thomson et al.

(10) Patent No.: US 7,194,699 B2
(45) Date of Patent: Mar. 20, 2007

(54) ANIMATING IMAGES TO REFLECT USER SELECTION

(75) Inventors: Michael J. Thomson, Redmond, WA (US); Uri Pomerantz, Fresno, CA (US); Larry A. Morris, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 780 days.

(21) Appl. No.: 10/342,628

(22) Filed: Jan. 14, 2003

(65) Prior Publication Data

US 2004/0135818 A1 Jul. 15, 2004

(51) Int. Cl.
*G06F 17/00* (2006.01)

(52) U.S. Cl. .................. 715/823; 345/170; 715/816; 715/821

(58) Field of Classification Search .............. 715/823, 715/816, 821; 345/170
See application file for complete search history.

(56) References Cited

U.S. PATENT DOCUMENTS

| 5,437,044 | A | * | 7/1995 | Hohner et al. ............. 710/72 |
| 5,565,888 | A | * | 10/1996 | Selker ....................... 715/823 |
| 5,909,667 | A | * | 6/1999 | Leontiades et al. ......... 704/275 |
| 5,936,554 | A | * | 8/1999 | Stanek ....................... 341/22 |
| 6,491,630 | B1 | * | 12/2002 | Saccardo et al. ........... 600/437 |
| 6,608,271 | B2 | * | 8/2003 | Duarte ...................... 200/311 |
| 6,614,422 | B1 | * | 9/2003 | Rafii et al. ................. 345/168 |
| 2002/0171633 | A1 | * | 11/2002 | Brinjes ...................... 345/168 |
| 2004/0021691 | A1 | * | 2/2004 | Dostie et al. .............. 345/773 |

* cited by examiner

*Primary Examiner*—Ba Huynh
*Assistant Examiner*—Sara M Hanne
(74) *Attorney, Agent, or Firm*—Workman Nydegger

(57) ABSTRACT

Images displayed on a display device are animated to reflect a user's selection of the images. According to one embodiment, the displayed images include keyboard characters that are selected when the user touches the display at the locations of the display where the images are shown. Selection of the displayed images can also be made through any combination of audio, optical, mechanical and electrical input devices. A plurality of selected images can also be animated simultaneously and by varying degree to reflect a sequence in which the images were selected by the user.

32 Claims, 4 Drawing Sheets

ANIMATING IMAGES TO REFLECT USER SELECTION

BACKGROUND OF THE INVENTION

1. The Field of the Invention

The present invention relates to methods and systems for using touch-sensitive displays and, more particularly, to methods and systems for animating images selected from touch-sensitive displays to reflect user selection of the images.

2. Background and Relevant Art

Touch-sensitive displays are well known in the computer industry. A touch-sensitive display enables a user to select one or more displayed images by touching the portions of the touch-sensitive display where the selected images are displayed. A touch-sensitive display is useful because it can be used for data entry. A variety of computing devices incorporate touch-sensitive displays, including, but not limited to personal computers, information kiosks, photocopiers, facsimile machines, vending machines, ATMs, control devices for machinery, and so forth. Touch-sensitive displays are particularly useful for small computing devices, such as PDAs (personal device assistants), which are configured without keyboards for data entry because of size constraints.

FIG. 1 illustrates one embodiment of a PDA 100 that is configured with a touch-sensitive display. In this embodiment, the PDA 100 includes various components that can be used for data entry, including a plurality of finger buttons 110, a touchpad 120, a touch-sensitive display 130, a pointer 140, and a touchpad keyboard 150 that is displayed on the touch-sensitive display 130. It will be appreciated that this embodiment of a PDA is merely illustrative and should not, therefore, be construed as limiting the scope of the invention.

According to one embodiment, the touchpad 120 is configured to receive text input that is written to the surface of the touchpad 120 in the form of a shorthand derivative, such as 'graffiti.' Text can be written to the touchpad 120, for example, with the pointer 140 or another device. Although the touchpad 120 is shown to be separated from the touch-sensitive display 130, it will be appreciated that in certain embodiments that the touchpad 120 and the touch-sensitive display 130 are integrated into a single display.

Although touchpads are useful for data entry, some users have found it difficult to learn the various shorthand notations that are required by the various PDA devices. Accordingly, many existing PDA devices are programmed to display a keyboard 150 that can be utilized by a user to select the text that the user desires to enter into the PDA. The keyboard 150 can be utilized, for example, when the user touches the keys of the keyboard 150 with the pointer 140, with the user's finger, or with another device. In the present example, the user has successfully entered the text ("Now is the time for all goo") into the PDA by touching the touch-sensitive display 130 at the locations on the keyboard 150 where the respective letters are displayed.

The keyboard 150 is useful, particularly for those who do not wish to learn the shorthand notation required to enter data through the touchpad 120. The keyboard 150, however, can also be difficult to use at times because the keys of the keyboard 150 are so small. The small size of the keys makes it easy to inadvertently select the wrong key, particularly when the user is using a relatively large finger to make the selection. Even when using the smaller pointer 140, it can still be difficult to ensure the correct selection has been made. Accordingly, users typically find themselves making frequent glances away from the keyboard 150 and up at the text that has been entered to ensure the correct key selections have been made.

Although the compact size of a PDA makes it relatively easy for a user to glance back and forth between the keyboard 150 and the typed text, it is still an inconvenience that would be desirable to avoid. Accordingly, there is currently a need in the art for an improved method for displaying images, such as keyboard keys, on a touch-sensitive display and in such a manner as to obviate the need for a user to glance back and forth between the displayed images and the typed text.

It will also be appreciated that similar problems extend to other existing devices that are configured to display the selections that are made by a user through other input device including, but not limited to, speech recognition devices.

Accordingly, there currently exists a need in the art for improved methods and systems for reflecting user selections received by computing devices.

BRIEF SUMMARY OF THE INVENTION

The present invention is directed to methods, systems and computer program products for animating the display of images, such as keyboard images, that are selected from a touch-sensitive display user to reflect the user's selection and to obviate the need for the user to iteratively glance away from the displayed images to ensure the desired images have been selected.

According to one aspect of the invention, a plurality of keyboard images is displayed on a touch-sensitive display. When a user selects one of the displayed images then the selected image is animated for a predetermined period. According to one embodiment, animation of the selected image includes highlighting, enlarging, indenting, raising, coloring, shading, or any other animation for contrasting the selected image from the other images and for indicating that the image has been selected. By animating the selected image, the user can see that the desired image was selected and without having to glance to another portion of the display.

According to another aspect of the invention, the animation of the selected image is modified after a predetermined period that can be user defined and system defined. The predetermined period may be based on time or events. For example, the predetermined period may expire after a certain amount of time has passed or after a subsequent image is selected. Modifying the animation of the selected image may include stopping the animation or reducing the amount of animation. According to the invention, any number of images can be displayed in varying stages of animation, and at the same time, to reflect a sequence in which the images are selected.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
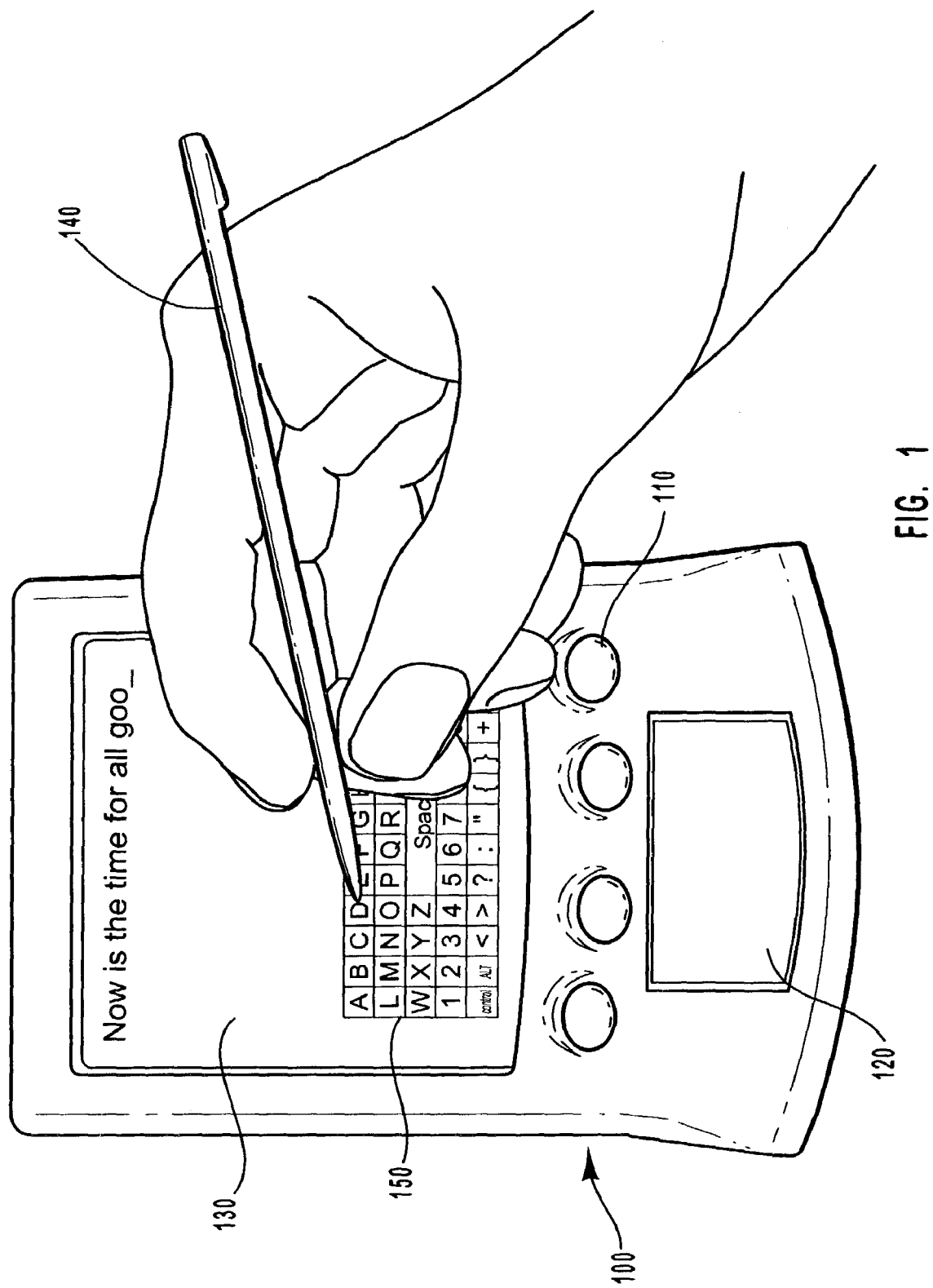
FIG. 1 illustrates one embodiment of a PDA displaying a keyboard on a touch-sensitive display.

The present invention extends to methods, systems and computer program products for animating images displayed on touch-sensitive displays. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other media, including physical media such as optical disk storage, magnetic disk storage or other magnetic storage devices, and any other medium which can be used to carry or store desired program code means or modules in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Computer-executable instructions, associated data structures, and program modules represent examples of the program code means for executing steps of the methods disclosed herein. Generally, program modules include routines, programs, objects, components, data structures, etc. that perform particular tasks or implement particular abstract data types. The particular sequence of such executable instructions or associated data structures represents examples of corresponding acts for implementing the functions described in such steps.

Those skilled in the art will appreciate that the invention may be practiced in various computing devices and environments with many types of computer system configurations, including personal computers, PDAs and other handheld devices, multi-processor systems, microprocessor-based or programmable consumer electronics, ATMs, telephone devices, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 2:
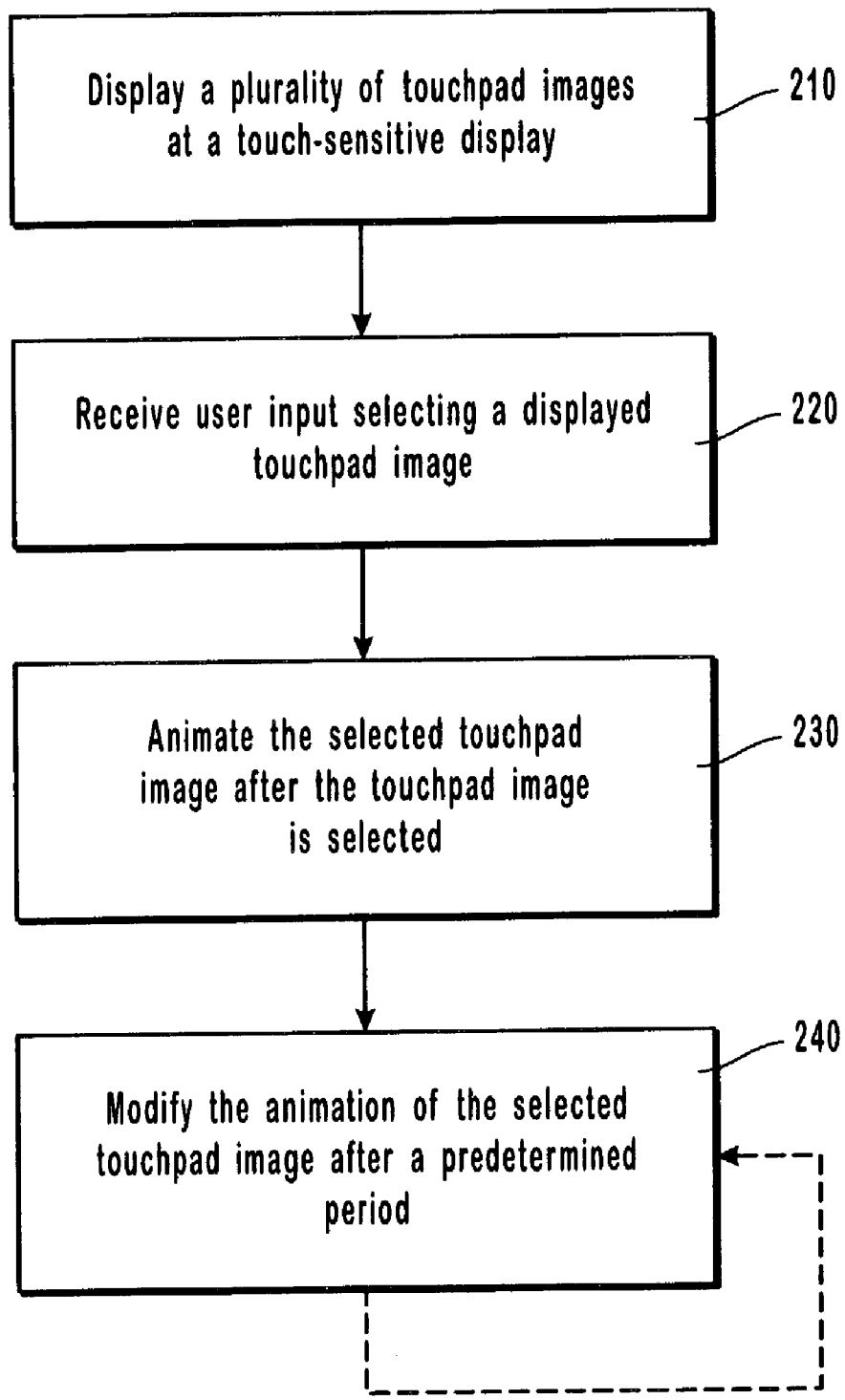
FIG. 2 illustrates a flowchart of one method for animating images displayed on a touch-sensitive display to reflect user selection of the displayed images.

FIG. 2 illustrates a flowchart of one embodiment of the invention for animating images displayed by a touch-sensitive display. According to one embodiment, the method illustrated in FIG. 2 is implemented in a computing system, as described above, and that includes a touch sensitive display that is configured to display images that can be selected when a user touches the tough sensitive display at locations on the display where the images are displayed. One non-limiting example of a suitable computing system for implementing the invention includes PDA 100 of FIG. 1.

As shown in FIG. 2, the methods of the invention include various acts (acts 210, 220, 230 and 240), each of which will now be described. The first illustrated act, includes displaying a plurality of touchpad images at a touch-sensitive display (act 210). The touchpad images that are displayed may include, for example, keyboard characters (e.g., letters, numbers, symbols, and other keys). It will be appreciated, however, that the invention is not limited to embodiments in which the touchpad images include keyboard keys. The images may, for example, comprise other symbols, icons, characters, and images. Other non-limiting examples of images that can be displayed include images representing the numbers on a calculator interface and selections from a user interface menu.

Once the touchpad images are displayed, they can be selected by a user (act 220). This may be accomplished, for example, when the user touches the display at the locations where the images are correspondingly displayed. After an image is selected by the user, it is animated (act 230) to indicate that it has been selected. Animating the selected image is useful for letting the user know when adequate pressure has been applied to the touch-sensitive display so that the user does not apply too much pressure. Animating the selected image is also useful for letting the user know which image has been selected, without having to glance at another portion of the display, such as at a text field. For example, with reference to FIG. 1, if the user desires to select the letter D, the user can apply pressure to the display at the location where the D is displayed. Once the D is selected, the user will notice the selection through animation of the letter D, and without having to look up at the typed text. Animating the letter D is also useful for letting the user know that the desired letter "D" was selected, and that an inadvertent selection of another letter such as letter "E" was not made instead.

According to the invention, the animation of a selection image can include any change in how the image is displayed to indicate that the image has been selected. Preferably, the animation contrasts the selected image with the unselected images. The animation of the selected image can also be modified (e.g., altered or ended) after a predetermined period (act 240) so that future image selections can be seen. The predetermined period generally begins after an image is selected and ends after any combination of time and events occurs. According to one embodiment, the predetermined period extends beyond the time in which the image is selected. The predetermined period may be set to begin, for example, only after the selected image is no longer being selected at the touch-sensitive display.

In one embodiment, the animation of a selected image terminates after a certain time has elapsed following the selection of the image. In another embodiment, animation of a selected image terminates following a particular event, such as the selection of a subsequent image. Termination or modification of the animation can also occur after a combination of time and events have occurred. Likewise, rather than modifying or terminating the animation of an image in a single instance, the animation can be modified or terminated in an incremental manner (e.g., after each lapse of a time period, following each subsequent selection of an image, and so forth).

Figure 3:
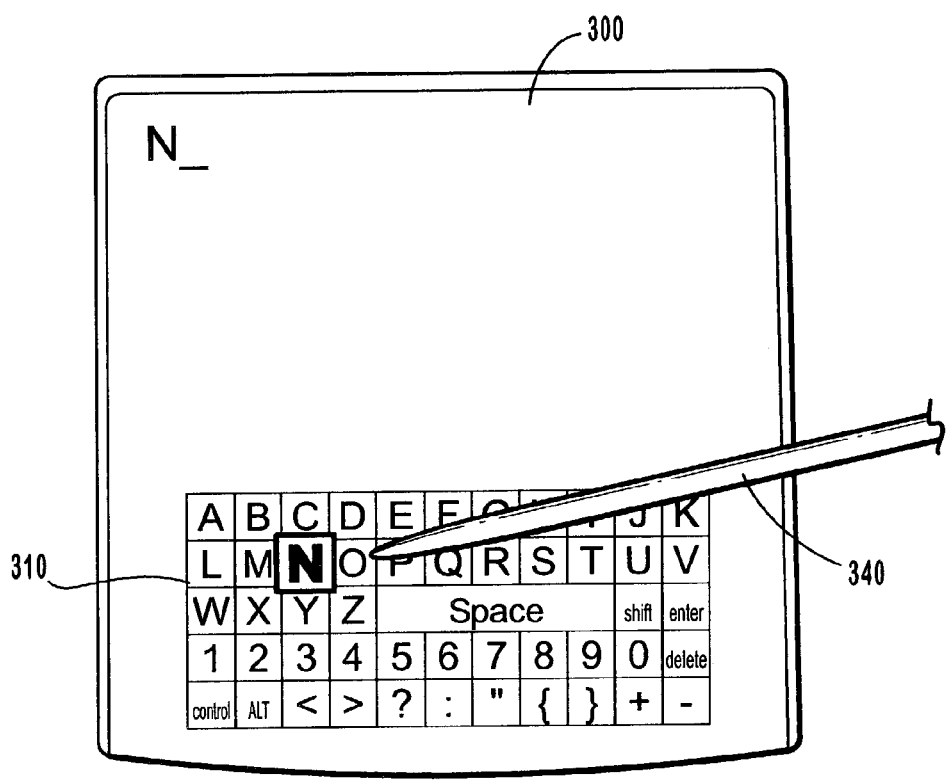
FIG. 3 illustrates one embodiment of a keyboard key image representing the letter N being animated on a touch-sensitive display by enlargement.
Figure 4:
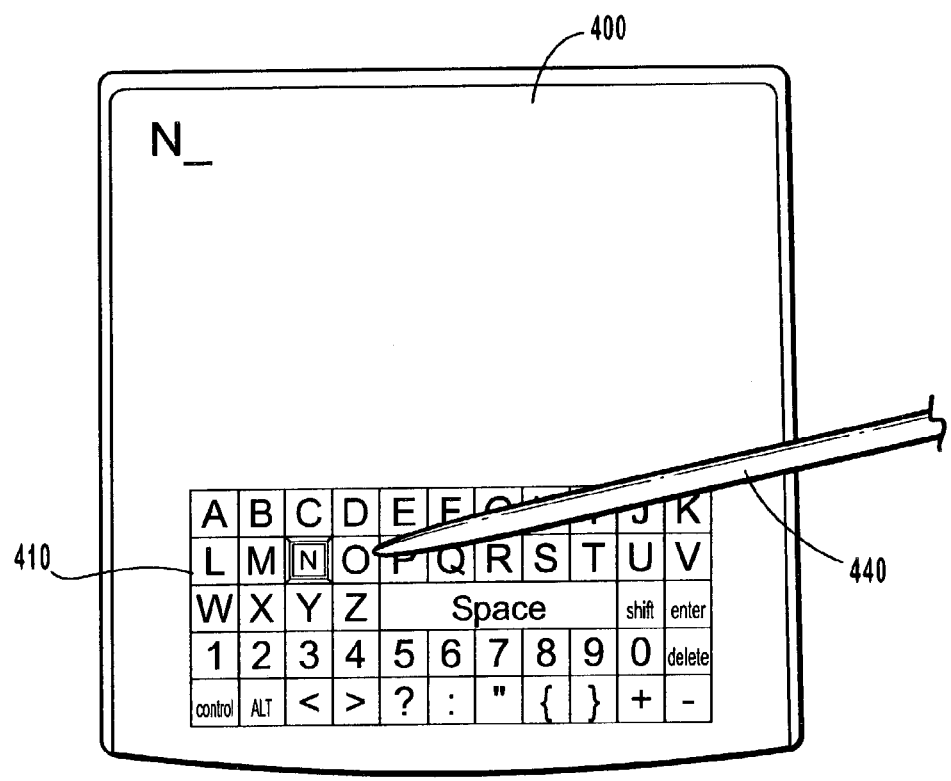
FIG. 4 illustrates one embodiment of a keyboard key image representing the letter N being animated on a touch-sensitive display by being recessed.
Figure 5:
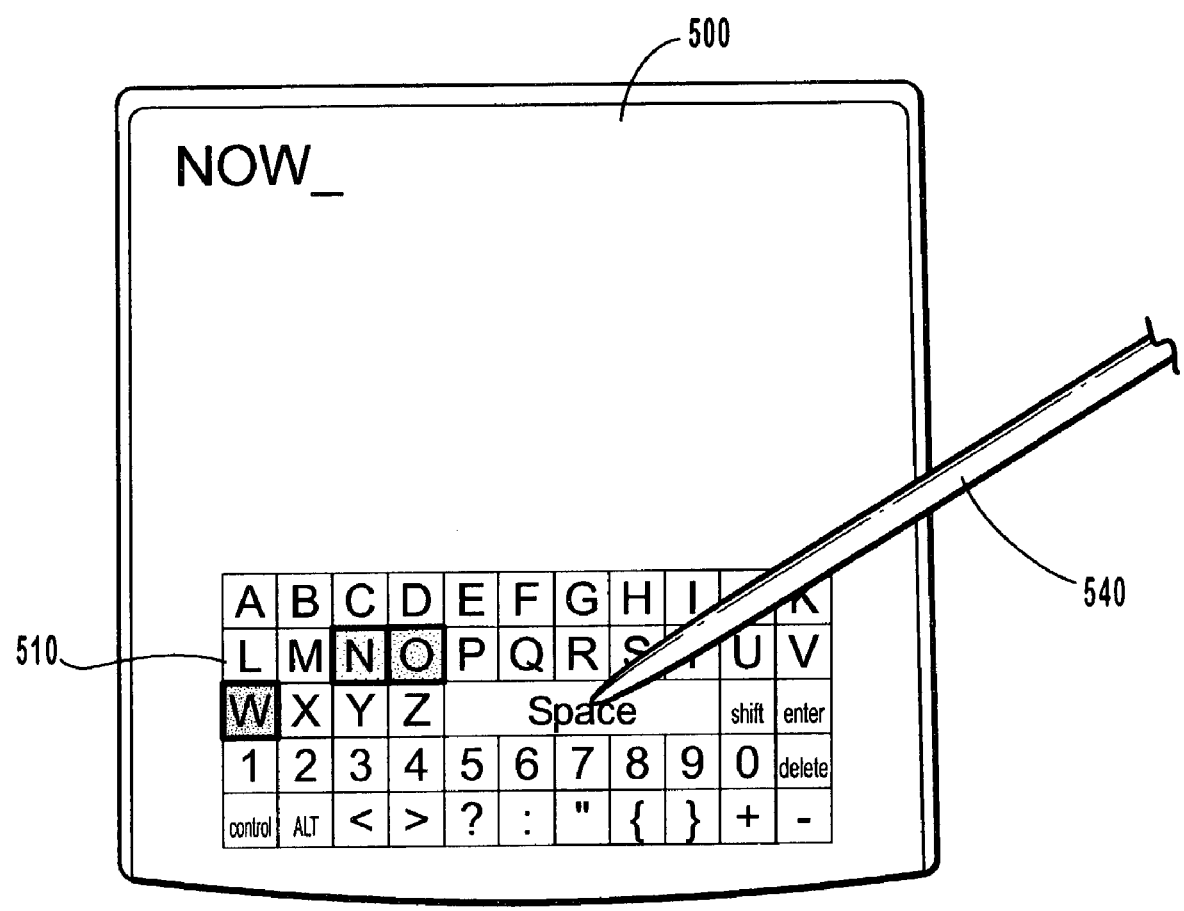
FIG. 5 illustrates one embodiment of a plurality of keyboard key images representing the letters N, O and W being animated through varying degrees of shading to indicate a sequence of selection.

FIGS. 3–5 will now be referenced to provide some non-limiting examples that illustrate how images can be animated to indicate user selection according to the invention.

FIG. 3 illustrates one embodiment of a touch-sensitive display 300. This display 300 may be disposed on a PDA or any other computing device. As shown, the display 300 is configured to display a keyboard 310 having keys that can be selected by a user. In this embodiment, the user has selected an image from the keyboard comprising the letter N. This selection can be made, for example, by touching the display 300 at the location where the letter N is displayed, such as with a finger, the pointer 340, or any other suitable object. Once the letter N image is selected, the computing device incorporating the display 300 interprets the selection and correspondingly displays the letter N in the text field portion of the display 300. According to the invention, the letter N image is also animated at the keyboard 310, thereby indicating to the user that the letter N has been selected. By providing this animation, the user does not have to glance away from the keyboard 310 to know the letter N has been selected.

In the present embodiment, the animation of the letter N image includes enlarging the image of the letter N. It will be appreciated, however, that the animation of a selected image can also occur in other ways. For example, as illustrated in FIG. 4, the selection of the letter N image from the display 400 with the pointer 440 causes the letter N image to be animated as a recessed character of the keyboard 410. Accordingly, the selected image may be animated through tinting, coloring, flashing, enlarging, recessing, emboldening, reducing, or changing the display of the selected image in any other manner.

The selected image may be animated for any predetermined period, after which the animation is modified (e.g., changed or terminated). In one embodiment, the animation of an image is modified as soon as a subsequent image is selected. For example, in FIG. 4, the letter N may remain animated until a subsequent image, such as the letter O is selected. At that time the letter O image will be animated and the letter N image will return to its previous display state.

According to another embodiment, as illustrated in FIG. 5, a plurality of images are animated at the same time by a touch-sensitive display 500. In this embodiment, the images comprising the letters N, O and W are selected from keyboard 510 when a user touches the display 500 with a pointer 540 at the locations on the display 500 where the letters are displayed.

The images of the letters N, O and W arrive at the animation states in a number of incremental steps. Initially, the letter N image is selected, causing the letter N image to be animated from the normal display state to a second state of heavy highlighting. Thereafter, when the letter 0 image is selected, the animation of the letter N image is modified from the heavy highlighting to a third state of medium highlighting. The letter O image is then animated with the heavy highlighting. Then, when the letter W image is selected, the animation of the letter N image is modified from the medium highlighting state to a low highlighting state. Contemporaneously, the animation of the letter O image is modified from the heavy highlighting state to the medium highlighting state and the letter W image is animated in the heavy highlighting state. In these states, the user is able to see the trail or sequence of keys that have been selected, and without having to glance away from the keyboard 510. It will be appreciated that the percentage of shading between the various animation states can be customized in any desired manner to accommodate various needs and preferences.

Although the foregoing example includes only three states of animation (e.g., heavy highlighting, medium highlighting, and low highlighting), it will be appreciated that animation of an image can be changed through any number of states. It will also be appreciated that the modification of animation may involve various animating techniques including highlighting, tinting, coloring, flashing, enlarging, recessing, emboldening, reducing, or changing the display of the selected image in any other manner. For example, the speed at which selected images flash on the display can be incrementally modified. Likewise, the size in which selected images are displayed can be incrementally modified. The color of the selected images can also be modified between selections, or to correspond to different sequences of selections, and so forth.

Furthermore, although the examples provided above are generally directed to embodiments in which user input is received through a touch-sensitive display, it will be appreciated that the invention broadly extends to other embodiments in which user input is received in other ways. For example, user input can also be received through voice commands received by the computing system. In such embodiments, the computing system includes sufficient program modules to interpret the voice commands and to associate the voice commands with the displayed images. This embodiment may be useful, for example, in car navigation so that a user can make selections from an interface display without having to remove her hands from the steering wheel. It will also be appreciated that this embodiment can also be useful for other speech recognition devices.

In other embodiments, user input is received when a user pushes a button or enters input through another mechanical, optical, audio and/or electrical input device. Accordingly, the present invention should be broadly construed to apply to methods for animating display images at a display interface upon receiving any suitable user input for selecting the display images.

In summary, the present invention enables a user to select images from a touch-sensitive display in such a manner that the user is able to see what selections have been made and without having to glance away from the image being selected. Although certain embodiments have been given with specific reference to keyboard key images, it will be appreciated that the invention extends beyond touch-sensitive keyboard applications. Furthermore, although certain examples have been given with respect to PDA's, it will be appreciated that the invention may be utilized with any touch-sensitive display.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system that includes a display that is configured to display keyboard input characters that can be selected by user input, a method for animating one or more keyboard input characters displayed by the display, upon being selected by the user, and for a predetermined period to reflect the selection of the one or more keyboard input characters by the user, the method comprising:
   an act of displaying a plurality of keyboard input characters at the display that can each be individually selected by user input received by the computing system;
   an act of receiving a first user input that selects a first keyboard input character;
   upon receiving the first user input, an act of animating the selected first keyboard input character;
   an act of maintaining the selected first keyboard input character animated even after receipt of a subsequent, second user input that selects a second keyboard input character; and
   after a predetermined period, an act of modifying the animation of the selected first keyboard input character at the display.

2. A method as recited in claim 1, wherein the first and second user input include audible user input.

3. A method as recited in claim 1, wherein the first and second keyboard input characters are displayed on a touch-sensitive display, such that each of the first and second keyboard input characters can be individually selected by the user touching one or more corresponding portions of the display proximate the displayed first and second keyboard input characters, and wherein the first and second user input comprise the user touching the one or more corresponding portions of the display.

4. A method as recited in claim 3, wherein the keyboard input characters include numbers associated with a calculator.

5. A method as recited in claim 3, wherein the computing system includes a PDA.

6. A method as recited in claim 3, wherein the act of animating the selected first keyboard input character includes highlighting the selected first keyboard input character.

7. A method as recited in claim 6, wherein the act of modifying the animation of the selected first keyboard input character includes the act of terminating the animation of the selected first keyboard input character.

8. A method as recited in claim 7, wherein the act of terminating the animation of the selected first keyboard input character occurs in a single instance.

9. A method as recited in claim 7, wherein the act of terminating the animation of the selected first keyboard input character occurs incrementally.

10. A method as recited in claim 3, further including the act of animating the second keyboard input character while the first keyboard input character is animated.

11. A method as recited in claim 10, wherein the animated first keyboard input character is in a different animation state than the animated second keyboard input character.

12. A method as recited in claim 11, wherein the different animation states allows a user to determine the order in which keyboard input characters have been selected.

13. A method as recited in claim 3, wherein the user input includes touching the touch-sensitive display.

14. A method as recited in claim 3, wherein the act of animating the first keyboard input character includes tinting the selected first keyboard input character.

15. A method as recited in claim 3, wherein the act of animating the first keyboard input character includes coloring the selected first keyboard input character.

16. A method as recited in claim 3, wherein the act of animating the first keyboard input character includes flashing the selected first keyboard input character.

17. A method as recited in claim 3, wherein the act of animating the first keyboard input character includes enlarging the selected first keyboard input character.

18. A method as recited in claim 3, wherein the act of animating the first keyboard input character includes recessing the selected first keyboard input character.

19. A method as recited in claim 3, wherein the act of animating the first keyboard input character includes emboldening the selected first keyboard input character.

20. A method as recited in claim 3, wherein the act of animating the first keyboard input character includes reducing the selected first keyboard input character.

21. In a computing system that includes a touch-sensitive display device that is configured to display one or more keyboards having key images that can be selected when a user touches the touch-sensitive display at locations where the key images are correspondingly displayed, a method for altering the display of one or more key images displayed by the touch-sensitive display, upon being selected by the user, and for a predetermined period, to reflect the selection of the one or more key images by the user, the method comprising:
   an act of displaying a keyboard at the touch-sensitive display, the keyboard including a plurality of discrete key images that can each be individually selected by a user touching the touch-sensitive display at locations where the key images are correspondingly displayed;
   an act of receiving a first user input at the touch-sensitive display that selects a first one of the key images by touch;
   upon receiving the first user input, an act of modifying the display of the selected first one of the key images at the display from a first display state to a second display state;
   an act of receiving a second user input at the touch-sensitive display that selects a second one of the key images by touch; and
   upon receiving the second user input,
      an act of modifying the display of the selected second one of the key images at the display from the first display state to the second display state, and
      an act of maintaining the display of the selected first one of the key images at the display in the second display state, even after receipt of the subsequent, second user input that selects a second one of the key images by touch, until a predetermined period lapses.

22. A method as recited in claim 21, wherein the computing system includes a PDA.

23. A method as recited in claim 21, wherein the acts of modifying the display of the first and second key images includes one or more acts of highlighting, tinting, coloring, flashing, enlarging, recessing, emboldening, and reducing the selected first and second key images.

24. A computer program product for use in a computing system that includes a touch-sensitive display that is configured to display one or more keyboards having key images that can be selected when a user touches the touch-sensitive display at locations where the key images are correspondingly displayed, the computer program product comprising:
   one or more physical computer-readable media having computer-executable instructions for implementing a method for animating one or more key images displayed by the touch-sensitive display, upon being selected by the user, and for a predetermined period, to reflect the selection of the one or more key images by the user, the method including:
      an act of displaying a plurality of touchpad key images at the touch-sensitive display, wherein each of the plurality of key images can be individually selected by a user touching the touch-sensitive display device at locations where the key images are correspondingly displayed;
      an act of receiving a first user input at the touch-sensitive display that selects a first one of the key images;
      upon receiving the first user input, an act of animating the selected first key image;
      an act of maintaining the selected first key image animated even after receipt of a subsequent, second user input that selects a second key image; and
      after a predetermined period, an act of modifying the animation of the selected first key image.

25. A computer program product as recited in claim 24, wherein the key images include numbers associated with a calculator.

26. A computer program product as recited in claim 24, wherein the computing system includes a PDA.

27. A computer program product as recited in claim 24, wherein the act of animating the selected first key image includes one or more of highlighting, tinting, coloring, flashing, enlarging, recessing, emboldening, and reducing the selected key image.

28. A computer program product as recited in claim 27, wherein the act of modifying the animation of the selected first key image includes the act of terminating the animation of the selected key image.

29. A computer program product as recited in claim 28, wherein the act of terminating the animation of the selected first key image occurs in a single instance.

30. A computer program product as recited in claim 28, wherein the act of terminating the animation of the selected first key image occurs incrementally.

31. A computer program product as recited in claim 24, further including the act of animating the second key image while the first key image is animated.

32. A computer program product as recited in claim 24, wherein the user input includes touching the touch-sensitive display.

* * * * *